Jan. 2, 1945. J. H. JENSON 2,366,408
CORN HARVESTER
Filed April 3, 1943 2 Sheets-Sheet 2
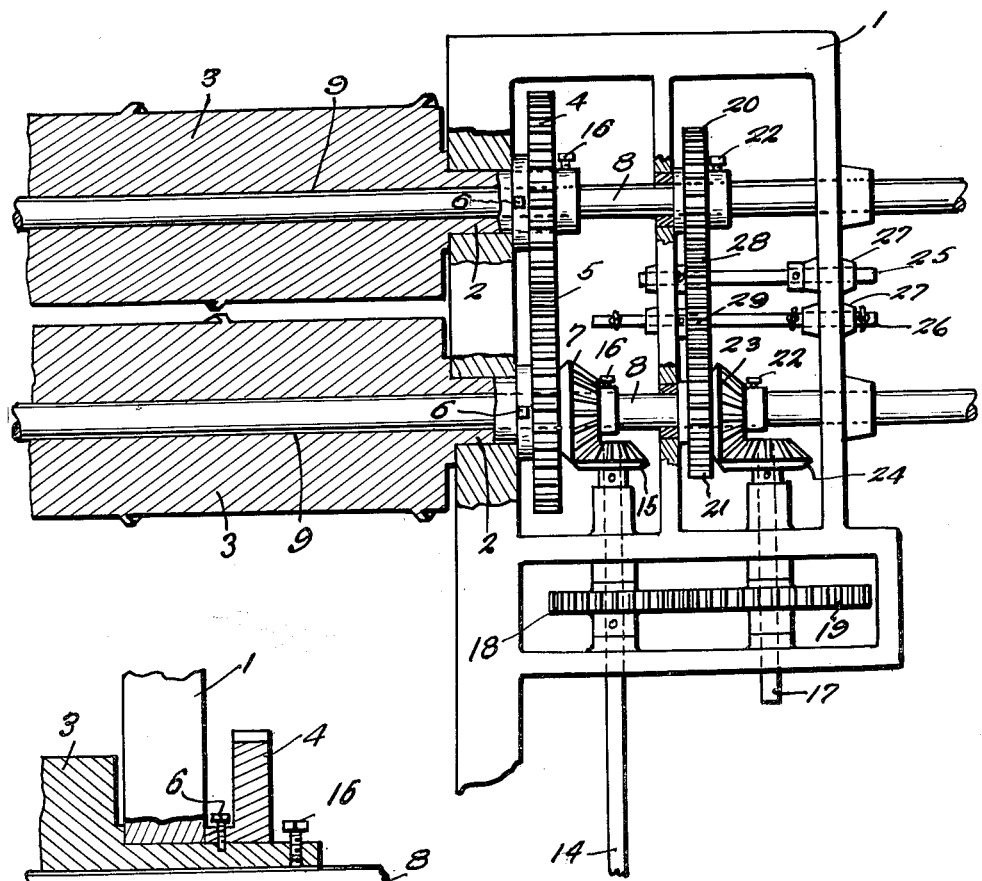
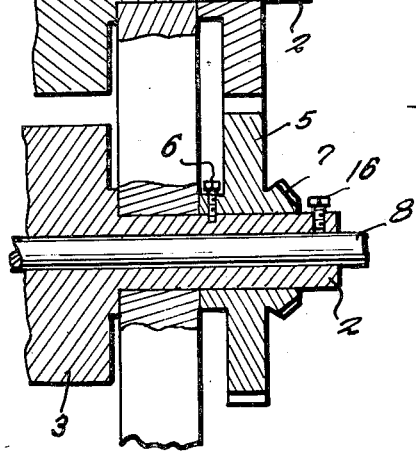
Inventor
Jens Harold Jenson
By Clarence A. O'Brien
and Harvey B. Jacobson
Attorneys Patented Jan. 2, 1945

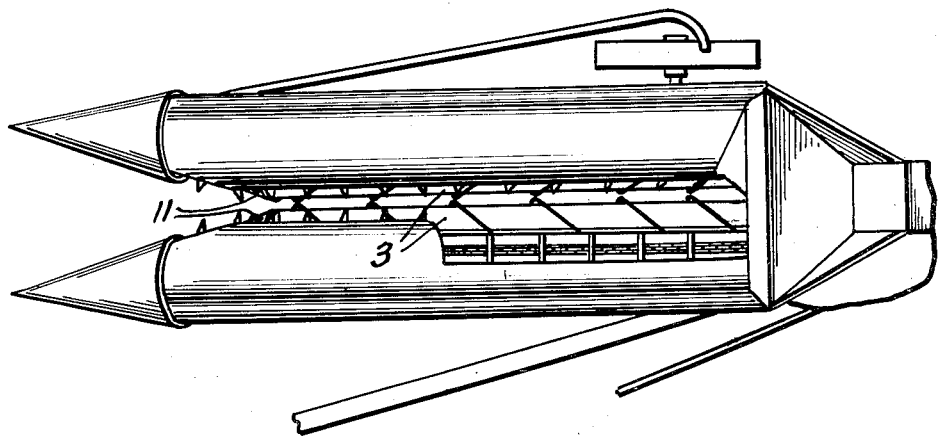
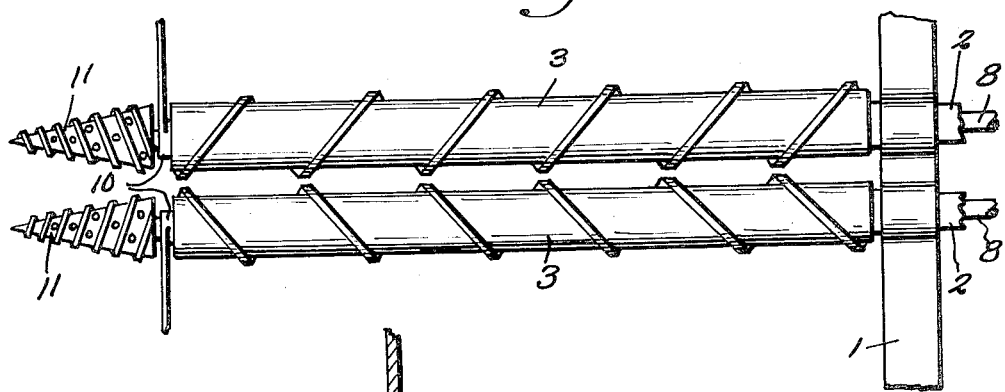
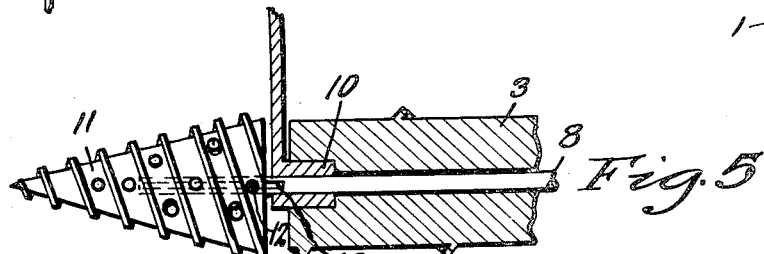
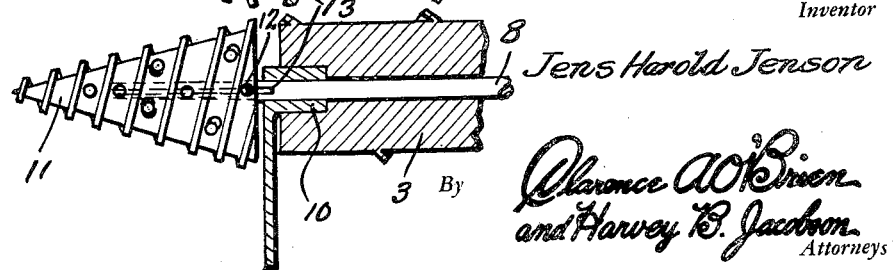

2,366,408

UNITED STATES PATENT OFFICE 2,366,408

CORN HARVESTER

Jens Harold Jenson, Cyrus, Minn., assignor of one-half to Carl A. Barsness, Cyrus, Minn.

Application April 3, 1943, Serial No. 481,750

2 Claims. (Cl. 56—104)

The present invention relates generally to new and useful improvements in corn harvesters, and has for its primary object to provide, in a manner as hereinafter set forth, a machine of this character comprising a unique construction and arrangement of snapping rolls and pick-up points, wherein the latter may be caused to rotate in the same direction as the snapping rolls or in the opposite direction, as desired.

Another very important object of the invention is to provide novel means for actuating or driving the snapping rolls and the pick-up points.

Other objects of the invention are to provide a corn harvester of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a plan view of a corn harvesting machine snapping unit constructed in accordance with the present invention.

Figure 2 is a plan view of the snapping rolls and the pick-up points.

Figure 3 is a plan view of the driving mechanism, showing adjacent portions of the snapping rolls in section.

Figure 4 is a view in horizontal section through a portion of the drive mechanism.

Figure 5 is a view in horizontal section through the forward portions of the snapping rolls, showing the pick-up points in plan.

Referring now to the drawings in detail, it will be seen that the embodiment of the invention which has been illustrated comprises a frame 1 of suitable metal. Journaled in the front portion of the frame 1 are tubular stub shafts 2 on the inner ends of a pair of snapping rolls 3. Meshed gears 4 and 5 are permanently secured to the tubular shafts 2 by set screws 6 for connecting the snapping rolls 3 for operation in unison and in opposite directions. The gears 4 are mounted in the frame structure 1. A beveled gear 7 is provided on one end of the gear 5.

Inner shafts 8 are journaled in the tubular outer shafts 2, said shafts 8 extending rotatably through longitudinal bores 9 which are provided therefor in the snapping rolls 3 and projecting beyond the forward ends of said snapping rolls. As illustrated to advantage in Figure 5 of the drawings, the forward end portions of the snapping rolls 3 are journaled on bearings 10. The inner shafts 8 are journaled in the bearings 10 and project forwardly therefrom. Spirally ribbed pick-up points 11 are mounted on the projecting forward end portions of the inner shafts 8. Countersunk set screws 12, engageable in ways 13 in the shafts 8, removably secure the pick-up points 11 in position on said shafts. Thus, the pick-up points 11 are interchangeable.

A drive shaft 14 from the usual source of power is journaled in the frame structure 1 at right angles to the shafts 2 and 8. A beveled gear 15 on one end portion of the drive shaft 14 is meshed with the beveled gear 7 on the gear 5. Set screws 16 are provided in the tubular outer shafts 2 for engagement with the inner shafts 8 for securing inner shafts to said outer shafts for rotation in unison therewith. Also journaled in the frame structure 1 is a shaft 17 which parallels the shaft 14. A gear 18 on the drive shaft 14 actuates a comparatively large gear 19 on the countershaft 17.

Gears 20 and 21 in the frame structure 1 are releasably secured to the shafts 8 by set screws 22. The gear 21 is provided, on one end, with a beveled gear 23. A beveled gear 24 on one end of the countershaft 17 drives the beveled gear 23.

Parallel shafts 25 and 26 are rotatably mounted in bearings 27 which are provided therefor in the frame structure 1, said shaft 26 also being longitudinally slidable. Idle gears 28 and 29 are fixed on the shafts 25 and 26, respectively, for releasably connecting the gears 20 and 21 for rotation in opposite directions. Any suitable means may be employed for shifting the shaft 26 and for securing same in its slidably adjusted position.

It is thought that the operation of the invention will be readily apparent from a consideration of the foregoing. Briefly, if it is desired to rotate the snapping rolls 3 and the pick-up points 11 in the same direction, the slidable shaft 26 is shifted rearwardly to disengage the gear 29 from the gears 21 and 28; the set screws 22 are loosened to release the gears 21 and 20 from their respective shafts 8, and the set screws 16 are tightened for locking the tubular shafts 2 to the shafts 8. Thus, the shafts 2 and 8 are positively connected to the drive shaft 14 for actuation thereby and the shafts 8 are disconnected from the countershaft 17. Of course, the construction and arrangement are such that, as usual, the snapping rolls 3 rotate in opposite directions or toward each other as viewed in top plan. If it is desired to rotate the pick-up points 11 in the opposite direction from their respective snapping rolls 3, the set screws 16 are loosened, the set screws 22 are tightened and the gear 29 is engaged with the gears 21 and 28, as seen in Figure 3 of the drawings. In this manner the tubular outer shafts 2 are driven in one direction by the drive shaft 14 and the oppositely rotating countershaft 17 drives the shafts 8 in the opposite direction.

With the pick-up points turning in the same direction as the snapping rolls, as at present, difficulty has heretofore been experienced in picking up stalks which have been broken or blown down in the direction of the row. It has been found that this difficulty is overcome by rotating the pick-up points oppositely from their respective snapping rolls, or upwardly and away from each other, as viewed in top plan. The ratio of the gears 18 and 19 is such that the speed of the shafts 8 is two-thirds that of the shafts 2 when the pick-up points 11 are being driven in opposite directions from their respective snapping rolls 3. This prevents the pick-up points from lifting the corn stalks out of the ground by the roots as the machine travels forwardly and gives the ears of corn sufficient time to reach the snapping rolls 3.

It is believed that the many advantages of a corn harvesting machine embodying the present invention will be readily understood, and although a preferred embodiment is as illustrated and described, it is to be understood that changes in the details of construction and in the combination and arrangement of parts may be resorted to which will fall within the scope of the invention as claimed.

What is claimed is:

1. A corn harvester comprising a frame, tubular outer shafts journaled in the frame, snapping rolls fixed on said outer shafts, inner shafts journaled in the outer shafts and extending rotatably through the snapping rolls, pick-up points fixed on the inner shafts forwardly of the snapping rolls, a drive shaft in the frame, means operatively connecting the drive shaft to the outer shafts for rotating said outer shafts in opposite directions relative to each other, and means operatively connecting the inner shafts to the drive shaft for rotation thereby in opposite directions relative to each other and to the respective outer shafts.

2. A corn harvesting machine comprising a frame, a pair of snapping rolls rotatably mounted on the frame, rotary shafts extending longitudinally through the snapping rolls and projecting from the forward ends thereof, pick-up points removably mounted on the forward end portions of the shafts, means for rotating the snapping rolls in opposite directions relative to each other, means for releasably securing the shafts to the snapping rolls for rotation in unison therewith, and means for driving the shafts in opposite directions relative to the respective snapping rolls.

JENS HAROLD JENSON.